(12) United States Patent
Fujita

(10) Patent No.: US 8,760,707 B2
(45) Date of Patent: Jun. 24, 2014

(54) PRINT DATA PROCESSING APPARATUS, CACHE PROCESSING METHOD, AND STORAGE MEDIUM

(75) Inventor: Ryo Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/337,446

(22) Filed: Dec. 27, 2011

(65) Prior Publication Data

US 2012/0182581 A1 Jul. 19, 2012

(30) Foreign Application Priority Data

Jan. 17, 2011 (JP) ................................. 2011-007154

(51) Int. Cl.
*G06K 15/00* (2006.01)
(52) U.S. Cl.
USPC ........................................................ 358/1.16
(58) Field of Classification Search
USPC .............................................. 358/1.16, 1.15
See application file for complete search history.

(56) References Cited

U.S. PATENT DOCUMENTS

2008/0165383 A1* 7/2008 Myoki .......................... 358/1.15
2010/0225945 A1* 9/2010 Hatano .......................... 358/1.13

FOREIGN PATENT DOCUMENTS

JP 2010-088104 A 4/2010

* cited by examiner

*Primary Examiner* — Tammy Pham
*Assistant Examiner* — Bharatkumar Shah
(74) *Attorney, Agent, or Firm* — Canon USA, Inc., IP Division

(57) ABSTRACT

A print data processing apparatus process variable print data includes a cache unit, a determination unit, a determining unit, and a writing unit. The cache unit caches image data generated according to a drawing command included in the variable print data as cache data in a cache memory. The determination unit determines whether it is necessary to write the cache data in a secondary storage medium that is different from the cache memory. The determining unit determines cache data to be written in the secondary storage medium, in response to the determination unit determining that it is necessary to write the cache data in the secondary storage medium, based on a number of pages to be processed before each cache data cached in the cache memory is used next. The writing unit writes the cache data determined by the determining unit in the secondary storage medium.

3 Claims, 13 Drawing Sheets

| CACHE DATA NAME | CACHE DATA APPEARING PAGE NUMBER(S) IN PRINT DATA | NUMBER OF PAGES TO BE PROCESSED BEFORE CACHE DATA IS USED NEXT | |
|---|---|---|---|
| | | IF PAGE NUMBER OF PRINT DATA IS REFERRED TO | IF ACTUALLY PROCESSED PAGE NUMBER IS REFERRED TO |
| object1 | 1, 2, 4 | NOT USED | 2 |
| object2 | 3, 5, 8 | 1 | 1 |
| object3 | 1, 4, 7, 8 | 2 | 3 |

FIG.7

| PRINTER ENGINE SPEED | CONTROLLER CPU CLOCK FREQUENCY | PREDETERMINED NUMBER OF PAGES |
|---|---|---|
| ≥ 60 ppm | ≥ 1.0 GHz | 100 |
| | < 1.0 GHz | 50 |
| < 60 ppm | ≥ 1.0 GHz | 150 |
| | < 1.0 GHz | 100 |

FIG.8

| CACHE DATA NAME | USED MEMORY AMOUNT | NUMBER OF PAGES TO BE PROCESSED BEFORE CACHE DATA IS USED NEXT |
|---|---|---|
| object01-01 | 5 MB | 5 |
| object01-02 | 5 MB | 5 |
| object01-03 | 2 MB | 5 |
| object02 | 10 MB | 3 |
| object03-01 | 15 MB | 1 |
| object03-02 | 12 MB | 1 |

FIG.9

| CACHE DATA NAME | UNAVAILABLE CACHE AMOUNT |
|---|---|
| object01-01 | 25 |
| object01-02 | 25 |
| object01-03 | 10 |
| object02 | 30 |
| object03-01 | 15 |
| object03-02 | 12 |

FIG.10

| CACHE DATA NAME | UNAVAILABLE CACHE AMOUNT | |
|---|---|---|
| | A | B |
| object01-01 | 5 | 20 |
| object01-02 | 5 | 20 |
| object01-03 | 5 | 8 |
| object02 | 3 | 20 |
| object03-01 | 1 | 0 |
| object03-02 | 1 | 0 |

FIG.11

| CACHE DATA NAME | USED MEMORY AMOUNT | NUMBER OF PAGES NOT USING CACHE DATA WHILE PREDETERMINED NUMBER OF PAGES IS PROCESSED |
|---|---|---|
| object01-01 | 5 MB | 30 |
| object01-02 | 5 MB | 30 |
| object01-03 | 2 MB | 30 |
| object02 | 10 MB | 50 |
| object03-01 | 15 MB | 20 |
| object03-02 | 12 MB | 20 |

FIG.12

| CACHE DATA NAME | UNAVAILABLE CACHE AMOUNT | |
|---|---|---|
| | A | B |
| object01-01 | 30 | 150 |
| object01-02 | 30 | 150 |
| object01-03 | 30 | 60 |
| object02 | 50 | 500 |
| object03-01 | 20 | 300 |
| object03-02 | 20 | 240 |

FIG.13

| CACHE DATA NAME | CACHE DATA APPEARING PAGE NUMBER(S) IN PRINT DATA | NUMBER OF PAGES TO BE PROCESSED BEFORE CACHE DATA IS USED NEXT | |
|---|---|---|---|
| | | IF PAGE NUMBER OF PRINT DATA IS REFERRED TO | IF ACTUALLY PROCESSED PAGE NUMBER IS REFERRED TO |
| object1 | 1, 2, 4 | NOT USED | 2 |
| object2 | 3, 5, 8 | 1 | 1 |
| object3 | 1, 4, 7, 8 | 2 | 3 |

PRINT DATA PROCESSING APPARATUS, CACHE PROCESSING METHOD, AND STORAGE MEDIUM

BACKGROUND OF THE INVENTION

1. Field of the Invention

The present invention relates to a print data processing apparatus, a cache processing method, and a related program.

2. Description of the Related Art

Recently, the demand for variable data printing (VDP) that can realize data printing according to an individual request from each client has expanded. The standard (i.e., VDP languages), such as personalized print markup language (PPML) and portable document format/variable and transactional (PDF/VT) is applied to digital variable data printing. According to the above-described VDP languages, images included in print data can be classified into a reusable object that can be used for a plurality of times and other objects. Thus, the VDP system is designed to cache image data of each reusable object appropriately so that the cached image data can be reused later. As one advantageous features of the VDP languages, a system can speedily perform print processing by caching and reusing data of each reusable object. For example, according to the PPML (one of the VDP languages), objects can be classified into two groups, reusable objects and other objects, which may be referred to as variable objects.

In general, the cache data of each reusable object in the above-described variable data printing is stored in a built-in memory, such as a random access memory (RAM), of a print data processing apparatus. However, the memory capacity of the processing apparatus is limited. The amount of cache data may exceed the memory capacity. In such a case, the VDP system writes (saves) the cache data that is currently present in the memory to a secondary storage medium, e.g., a hard disk drive, provided in the processing apparatus. Further, when the cache data saved in the secondary storage medium is used, it may be required that the VDP system performs processing for loading the cache data from the secondary storage medium into the memory.

A general swap processing technique is employable to realize the above-described processing for writing and reading cache data to/from a secondary storage medium. However, the processing of the secondary storage medium takes a relatively longtime compared to the processing time of the built-in memory. Therefore, if the number of swap operations increases, the time required for print data processing increases.

Therefore, to improve the efficiency in variable print data processing, an appropriate method is required to reduce the number of operations to be performed to swap cache data to the secondary storage medium.

To solve the above-described issue, there is a conventional technique which is discussed in Japanese Patent Application Laid-Open No. 2010-88104. According to the technique, a processing order of each record of variable print data is determined so as to reduce the number of swap operations and load on the memory area. In this case, a record invariable data printing is a unit for assembling print data pieces. For example, in a printing operation performed on a client-by-client basis, print data pieces of each client constitutes one record.

However, according to the above-described conventional technique, although the number of swap operations can be reduced and the print processing can be accomplished speedily, the output order of printed records may change. It is not only the VDP, but the output order of print data should reflect a user's intent when a print data processing apparatus performs printing of print data. For example, in a case where the print processing is accompanied by post-processing, the inconvenience will arise in the post-processing if the print order of records is not maintained accurately. More specifically, assuming a case that the print data processing apparatus prints a product to be distributed to each employee with an employee number printed thereon by the VDP, and it is desired to output the printed products in order of employee number to facilitate the distribution. In such a case, the order of records cannot be changed if each record corresponds to a specific employee. Further, there is a case where the print data processing apparatus prints a large number of direct mails by the VDP, and an inspection machine in post-processing checks whether addresses and names have been correctly printed. In many cases, the order of right data to be input to the inspection machine is required to be identical to the output order of the printed products. In such a case, the print data processing apparatus is required to output the products without changing the order of records. Therefore, the above-described conventional technique cannot be used to accomplish the variable data printing speedily.

As a method capable of increasing the processing speed while maintaining the output order of printed products correctly, it may be useful to control the swap order of cache data of reusable objects. In this case, determination of a swap priority order for each cache data influences the number of swap operations to be performed in print data processing. Therefore, if the swap priority order determination method is inappropriate, the number of swap operations increases and the time required for the print data processing increases correspondingly.

To solve the above-described issue, it is important to provide an appropriate method for determining the priority order of each cache data, to identify cache data to be written into a secondary storage medium when a plurality of pieces of cache data is present in the memory, so that the processing speed can be increased.

SUMMARY OF THE INVENTION

The present invention relates to a mechanism capable of determining a writing priority order of cache data in variable print processing so as to reduce the number of swap operations for cache data generated during print data processing.

According to an aspect of the present invention, a print data processing apparatus configured to process variable print data includes a cache unit configured to cache image data generated according to a drawing command included in the variable print data as cache data in a cache memory, a determination unit configured to determine whether it is necessary to write the cache data in a secondary storage medium that is different from the cache memory, a determining unit configured to determine cache data to be written in the secondary storage medium, in response to the determination unit determining that it is necessary to write the cache data in the secondary storage medium, based on a number of pages to be processed before each cache data cached in the cache memory is used next, and a writing unit configured to write the cache data determined by the determining unit in the secondary storage medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a table that can be used to determine the number of pages with reference to central processing unit (CPU) processing speeds of a printer engine and a controller unit.

FIG. 8 illustrates an example of information to be acquired by a cache control unit according to a first exemplary embodiment.

FIG. 9 illustrates an example (part I) of unavailable cache amounts calculated according to the first exemplary embodiment.

FIG. 10 illustrates an example (part II) of unavailable cache amounts calculated according to the first exemplary embodiment.

FIG. 11 illustrates an example of information to be acquired by a cache control unit according to a second exemplary embodiment.

FIG. 12 illustrates an example of unavailable cache amount calculated according to the second exemplary embodiment.

FIG. 13 illustrates an example of a number-of-pages calculation method that is applicable to a saddle stitch binding print operation.

DESCRIPTION OF THE EMBODIMENTS

Various exemplary embodiments, features, and aspects of the invention will be described in detail below with reference to the drawings.

Figure 1:
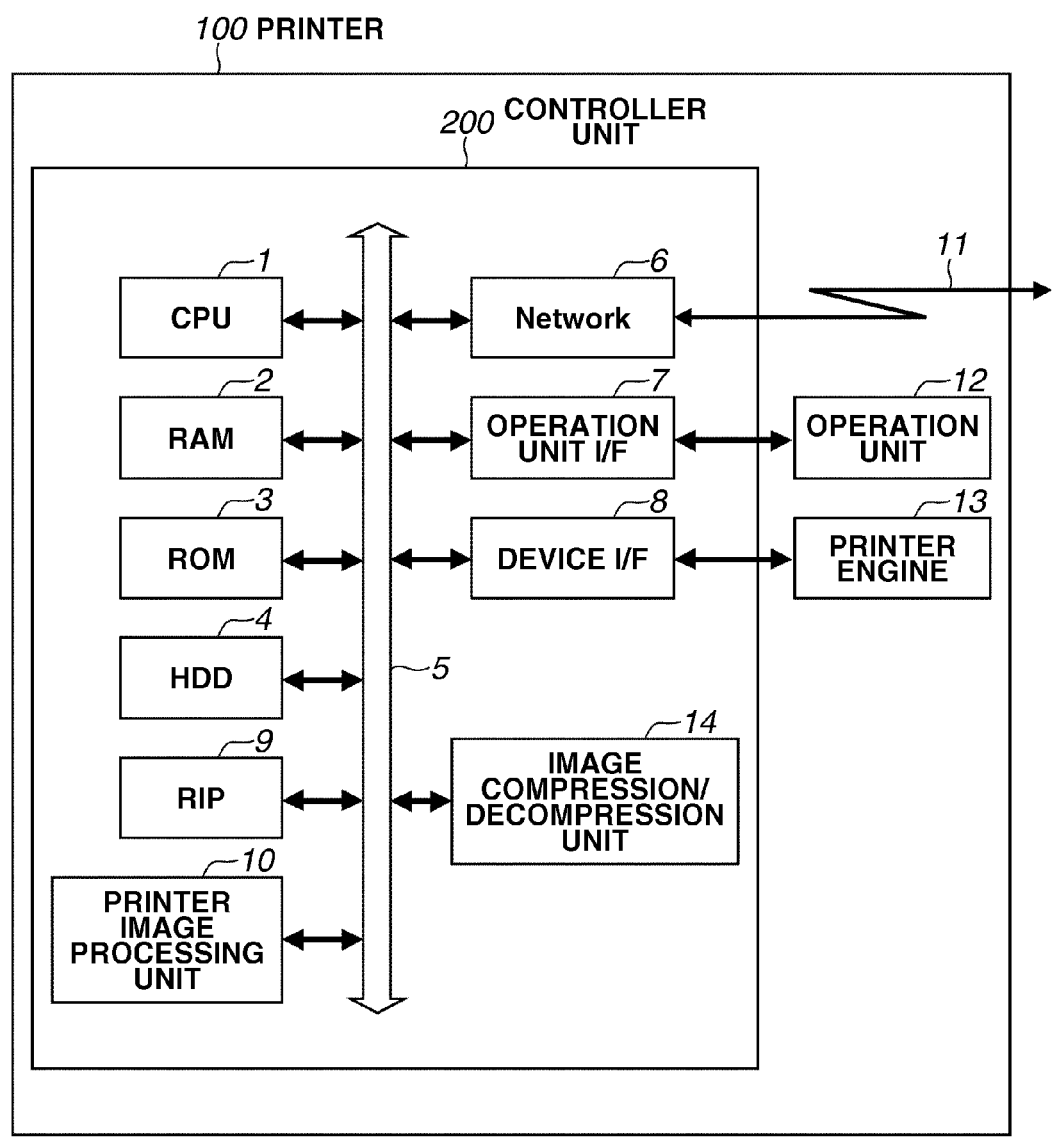
FIG. 1 illustrates an example of a hardware configuration of a printer (or a computer) that serves as a print data processing apparatus according to an exemplary embodiment.

FIG. 1 illustrates an example of a hardware configuration of a printer (or a computer) 100 that can serve as a print data processing apparatus. The configuration of a simple body of the print data processing apparatus is described in a first exemplary embodiment. However, the present invention can be applied to a system configuration in which processing to be performed by the print data processing apparatus is separately executed by a host computer accessible via a network.

A controller unit 200 controls input and output of image signals and device information. A central processing unit (CPU) 1 can execute a program when the program is loaded into a RAM 2 from a read only memory (ROM) 3 or a hard disk drive (HDD) 4. The CPU 1 performs an integrated control for respective devices connected via a system bus 5. The RAM 2 is functionally operable as a main memory or a work memory for the CPU 1. The ROM 3 stores a boot program to be executed when a power source is turned on. The HDD 4 stores an operating system and a control program for the printer 100. Further, the HDD 4 is usable to store large volumes of data (e.g., image data and print data) temporarily or for a long time.

A network 6 is connected to a local area network 11 to allow the printer 100 to input and output print data and device information from and to an external device. An operation unit interface (I/F) 7, i.e., an interface unit for an operation unit 12, outputs image data to the operation unit 12 that displays the received image data on its display device. Further, the operation unit I/F 7 can transmit to the CPU 1, information input by a user of the apparatus via the operation unit 121. The operation unit 12 includes a liquid crystal panel and a sound source that can serve as output devices, and further includes a touch panel and hard keys that can serve as input devices.

The controller unit 200 is connected to a printer engine 13 via a device I/F 8. The device I/F 8 transmits an image signal to an associated device, instructs the device to perform an operation, and receives information from the device based on an instruction from the CPU 1. The printer engine 13 is an output machine that outputs the image signal from the controller unit 200 to a printing medium. The printer engine 13 may be an electro-photographic type or an inkjet type.

A raster image processor (RIP) 9 is a hardware dedicated to rasterizing of intermediate print data into a raster image. The RIP 9 can speedily process intermediate print data generated on the RAM 2 by the CPU 1 in parallel with the processing of the CPU 1. A printer image processing unit 10 can perform image correction and half-toning processing on print output image data. An image compression/decompression unit 14 can perform compression/decompression processing on image data.

A software configuration and processing according to a flowchart described below can be realized when the CPU 1 executes processing based on a program.

The printer 100 can process variable print data.

Figure 2A:
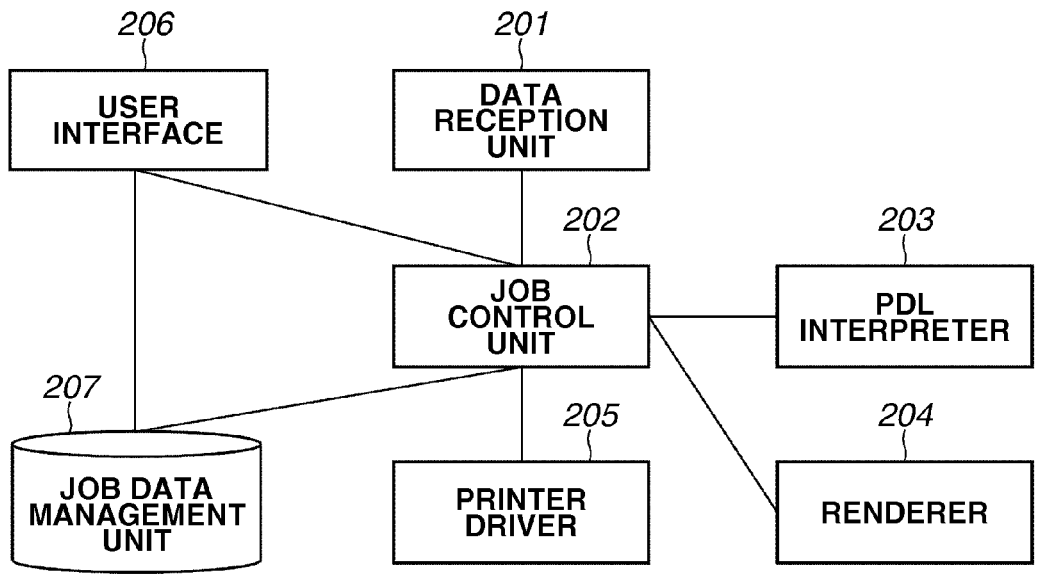
FIG. 2A illustrates an example of a software module configuration of the print data processing apparatus according to an exemplary embodiment.

FIG. 2A illustrates an example of a software module configuration of the print data processing apparatus (i.e., the printer 100).

A data reception unit 201 receives print data from a host computer. The received data can be stored in a job data management unit 207 via a job control unit 202. The job control unit 202 executes an overall job control including data reception and data printing. A PDL interpreter 203 can interpret print data and generate a display list as intermediate data. The generated display list can be stored in the job data management unit 207 via the job control unit 202.

A renderer 204 is a module that is capable of generating a bitmap image based on the display list. The RIP 9 as the dedicated hardware processes many of the data pieces. The generated bitmap image is stored in the job data management unit 207 via the job control unit 202. A printer driver 205 instructs the printer engine 13 to perform printing and transmits a bitmap image via the device I/F 8.

A user interface 206 is a module that is capable of controlling the operation unit 12 via the operation unit I/F 7. The user interface 206 mainly generates data to be displayed on a liquid crystal panel of the operation unit 12 and updates the content to be displayed on the liquid crystal panel according to a user's instruction input via the touch panel. Further, if a job execution instruction is input via the touch panel, the user interface 206 transmits the instruction to the job control unit 202. The job data management unit 207 is a database that can store and manage print data, display lists, and bitmap images temporarily or for a long time.

Figure 2B:
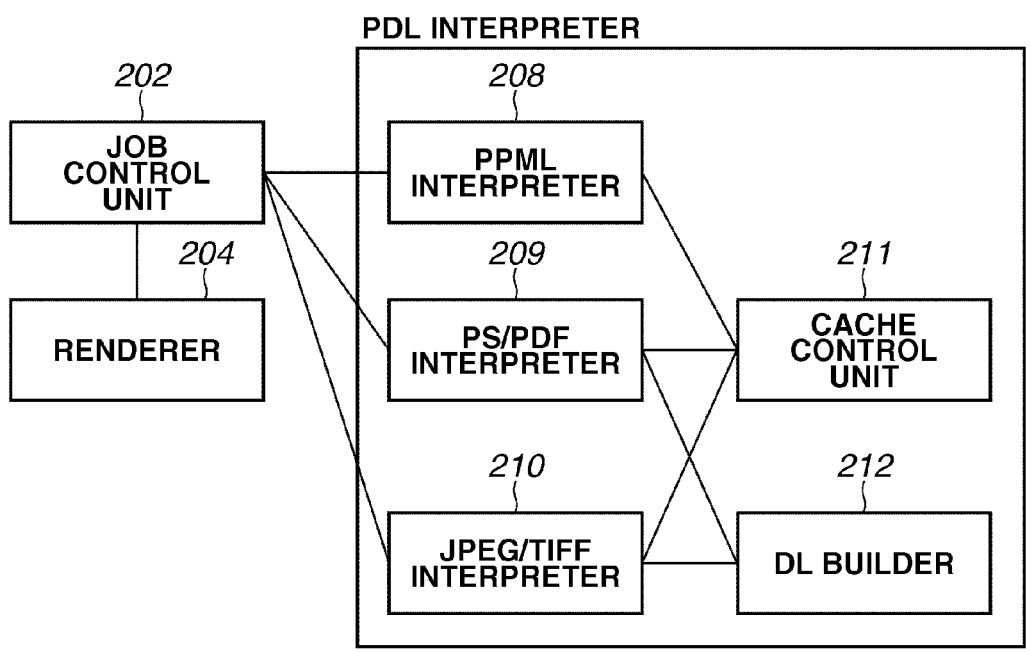
FIG. 2B illustrates an example of a detailed software module configuration of a page description language (PDL) interpreter illustrated in FIG. 1.

FIG. 2B illustrates an example of a detailed software module configuration of the PDL interpreter 203 illustrated in FIG. 1. In the present exemplary embodiment, page description language (PDL) included in print data is personalized print markup language (PPML). However, the PDL interpreter 203 can be configured to include any additional interpreter that can interpret other VDP language, such as PDF/VT. Further, in the present exemplary embodiment, the content PDL of PPML data is any one of PostScript (registered trademark) (hereinafter, referred to as "PS"), PDF, joint photographic experts group (JPEG), and tagged image file format (TIFF). However, any other content PDL is combinable.

A PPML interpreter 208 can interpret PPML data. A PS/PDF interpreter 209 can interpret PS data and PDF data. A JPEG/TIFF interpreter 210 can interpret JPEG data and TIFF data. A DL builder 212 is connected to the PS/PDF interpreter 209 and the JPEG/TIFF interpreter 210 to output a display list (i.e., intermediate data).

A cache control unit 211 can cache a drawing object as a bitmap image or a display list. If the PPML data includes an instruction to reuse the drawing object, the PPML interpreter 208 cooperates with the cache control unit 211 to reuse the drawing object. The PPML interpreter 208 is an example of a page description language processing unit.

Figure 3:
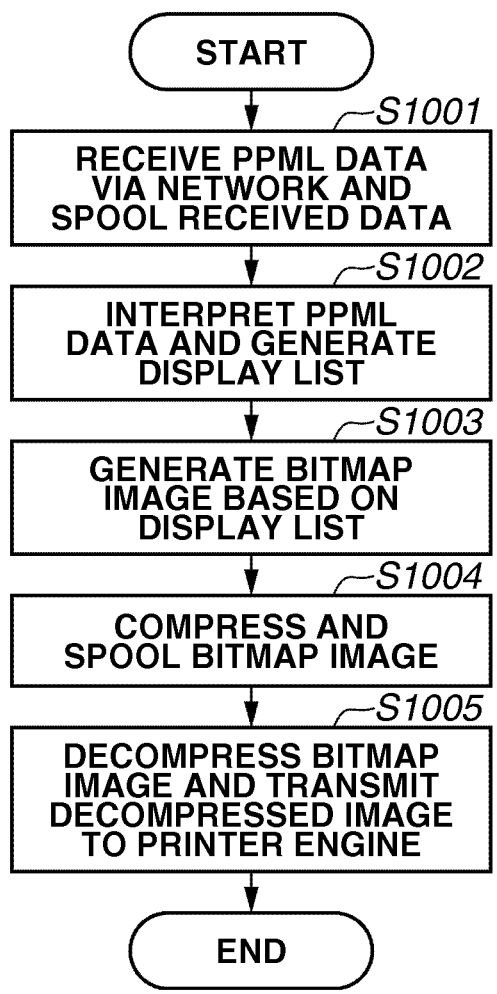
FIG. 3 is a flowchart illustrating an example of PPML data print processing.

Next, PPML data print processing according to the present exemplary embodiment is described with reference to a flowchart illustrated in FIG. 3. FIG. 3 is a flowchart illustrating an example of the PPML data print processing.

First, in step S1001, the data reception unit 201 receives PPML data from a host computer via the network. The data reception unit 201 notifies the job control unit 202 of input of a job. The job control unit 202 spools the received PPML data in the job data management unit 207.

In step S1002, the job control unit 202 instructs the PPML interpreter 208 to interpret the PPML data. The PPML interpreter 208 interprets the PPML data and generates a display list as the intermediate data in cooperation with the PS/PDF interpreter 209, the JPEG/TIFF interpreter 210, the DL builder 212, and the cache control unit 211. The job control unit 202 temporarily stores the generated display list in the job data management unit 207.

In step S1003, the job control unit 202 instructs the renderer 204 to generate a bitmap image of the display list. The renderer 204 uses the RIP 9 to generate a bitmap image of the display list.

In step S1004, the job control unit 202 causes the image compression/decompression unit 14 to compress the generated bitmap image and temporarily stores the compressed image in the job data management unit 207. The job control unit 202 deletes each display list stored in the job data management unit 207, if generation of the corresponding bitmap image is completed.

In step S1005, the job control unit 202 instructs the printer driver 205 to transmit the bitmap image to the printer engine 13. The printer driver 205 transmits the bitmap image to the printer engine 13, while synchronizing with the printer engine 13. Further, the printer driver 205 causes the image compression/decompression unit 14 to perform decompression processing on the bitmap image before transmitting the bitmap image to the printer engine 13. The printer driver 205 deletes the bitmap image stored in the job data management unit 207 if it completes the transmission of the bitmap image to the printer engine 13.

The job control unit 202 can perform the above-described processing in step S1002 to step S1005 as batch processing applied to the entire data of all pages or as successive processing applied to each page. When the job control unit 202 performs the above-described processing successively for each page, the processing to be performed in step S1002 to step S1005 can be pipelined so that the processing in respective steps can be executed in parallel to each other.

Figure 4:
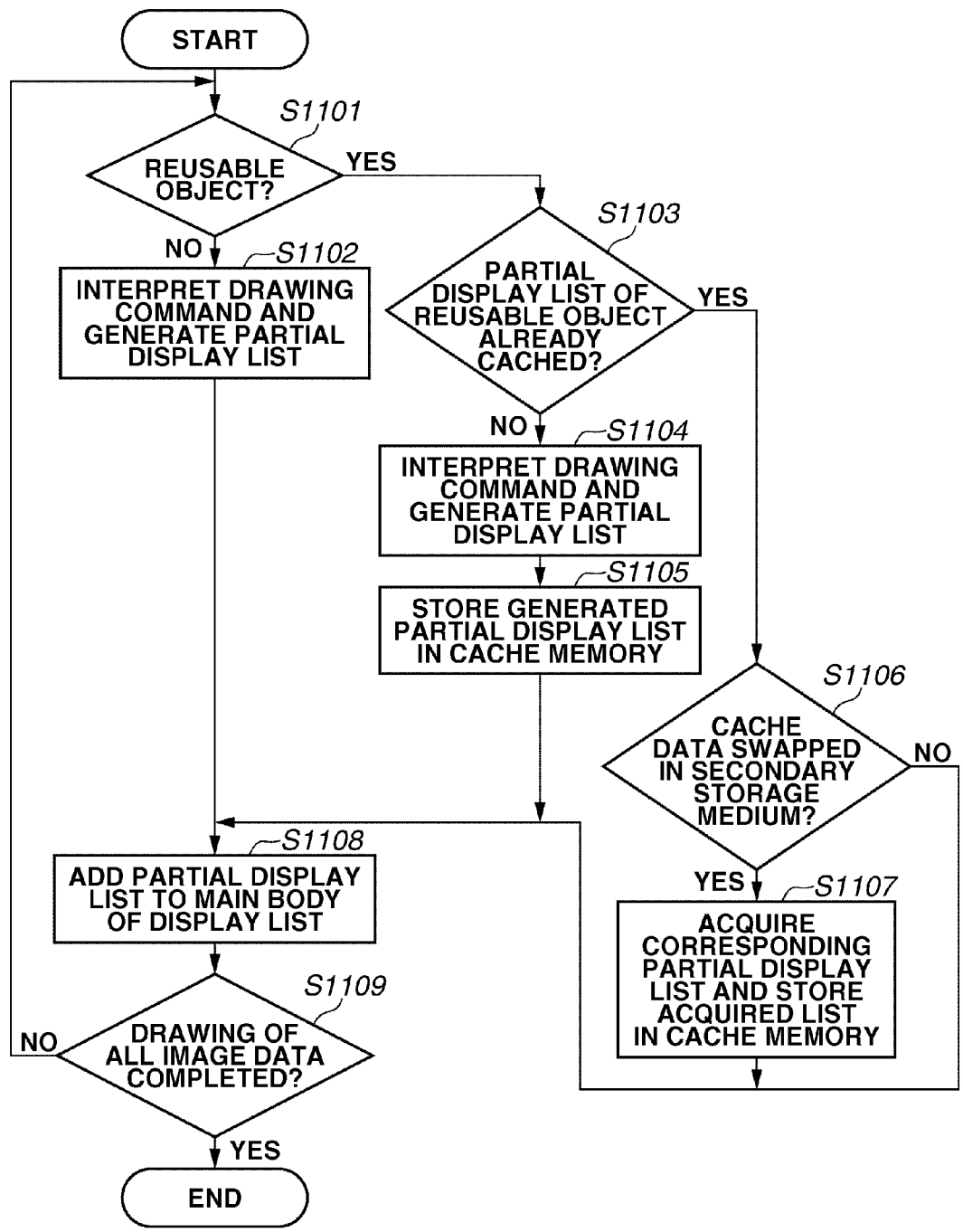
FIG. 4 is a flowchart illustrating an example of PPML data interpretation processing.

Next, the processing to be performed in step S1002 illustrated in FIG. 3, i.e., the processing relating to drawing and cache of image data to be performed by the PPML interpreter 208, is described in detail below with reference to FIG. 4. FIG. 4 is a flowchart illustrating an example of PPML data interpretation processing.

First, if the PPML data includes an image data drawing command, then in step S1101, the PPML interpreter 208 determines whether the image data is a reusable object. If the PPML interpreter 208 determines that the image data is not a reusable object, namely when the image data is not reused (NO in step S1101), the processing proceeds to step S1102.

In step S1102, the PPML interpreter 208 instructs the PDL interpreter that should process the image data to interpret the drawing command and generate a partial display list. Any one of the interpreters executes the above-described processing. In the present exemplary embodiment, the PDL interpreter that should process the image data is the PS/PDF interpreter 209 if the content PDL is PS or PDF and the JPEG/TIFF interpreter 210 if the content PDL is JPEG or TIFF.

In the present exemplary embodiment, the partial display list is intermediate data that constitutes the display list i.e., the intermediate data of one complete page. The PDL interpreter generates a partial display list for each image data in the print data. For example, it is assumed that a piece of PS data and a piece of JPEG data are disposed on a page of the print data. In this case, the display list of the page includes a partial display list that corresponds to the PS data and a partial display list that corresponds to the JPEG data. As another example, the PDL interpreter can generate a plurality of partial display lists for a piece of image data.

If the image data is a reusable object, the PPML interpreter 208 determines whether cache data of the reusable object is already generated. In the present exemplary embodiment, it is assumed that the above-described partial display list is usable as cache data of a reusable object. Accordingly, if the PPML interpreter 208 determines that the image data is a reusable object (YES in step S1101), then in step S1103, the PPML interpreter 208 determines whether the partial display list of the image data has been already cached, in cooperation with the cache control unit 211. If the PPML interpreter 208 determines that the partial display list of the image data is not yet cached (NO in step S1103), the processing proceeds to step S1104.

In step S1104, the PPML interpreter 208 instructs the PS/PDF interpreter 209 or the JPEG/TIFF interpreter 210 to generate a partial display list, similar to step S1102. Any one of the interpreters executes the above-described processing. In step S1105, the PPML interpreter 208 stores the partial display list generated in step S1104 in a cache memory, in cooperation with the cache control unit 211.

If the PPML interpreter 208 determines that the partial display list of the image data is already cached (YES in step S1103), the processing proceeds to step S1106.

In step S1106, the PPML interpreter 208 determines whether the cache data is already swapped in the HDD 4, in cooperation with the cache control unit 211. In the present exemplary embodiment, if any data stored in the secondary storage medium, such as the hard disk drive, is used, it is assumed that processing for loading the data to the memory (e.g., RAM) is necessary.

Accordingly, if the PPML interpreter 208 determines that the cache data is already swapped in the HDD 4 (YES in step S1106), the processing proceeds to step S1107. In step S1107, the PPML interpreter 208 acquires the partial display list of the reusable object from the HDD 4 and stores the acquired partial display list in the cache memory.

Trough the above-described control, the PPML interpreter 208 can generate or load the partial display list of image data in any case.

In step S1108, the partial display list is added to the main body of the display list by any one of the PS/PDF interpreter 209 or the JPEG/TIFF interpreter 210 that has generated the partial display list, or by the cache control unit 211 that has acquired the partial display list. In step S1109, the PPML interpreter 208 determines whether the drawing of all the image data pieces is completed. If the PPML interpreter 208 determines that the drawing of the entire image data is not completed yet (NO in step S1109), the PPML interpreter 208 repetitively performs the above-described processing.

Figure 5:
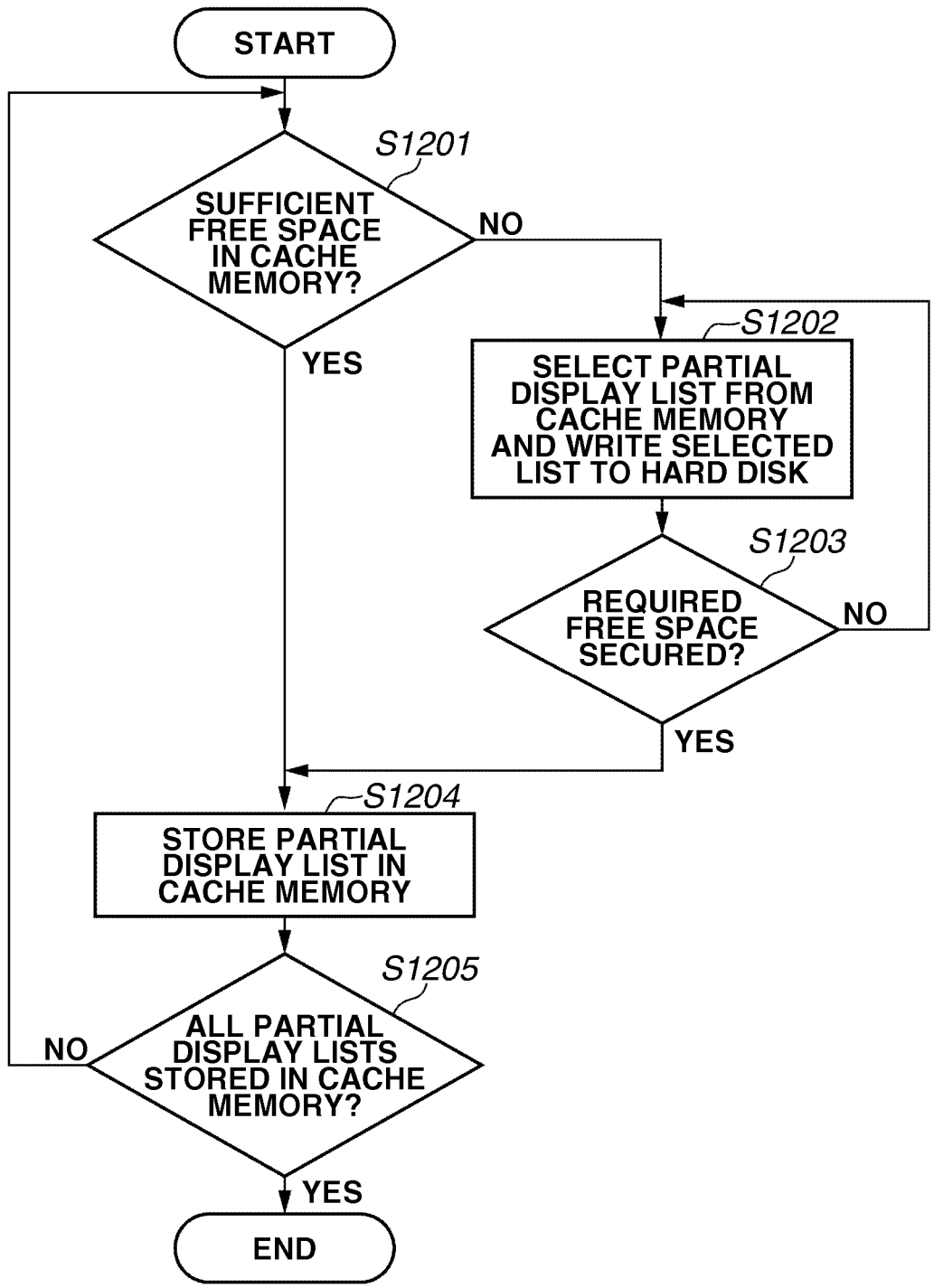
FIG. 5 is a flowchart illustrating an example of reusable object cache processing.

Swap processing to be performed in caching of the partial display list of the reusable object is described below with reference to FIG. 5. The swap processing illustrated in FIG. 5 is performed when the PPML interpreter 208 generates the partial display list corresponding to the reusable object and stores the generated list in the cache memory or when the PPML interpreter 208 acquires the swapped partial display list from the HDD 4 and stores the acquired list in the cache memory. More specifically, the swap processing illustrated in FIG. 5 is performed occasionally during the processing of step S1105 and step S1107 illustrated in FIG. 4. FIG. 5 is a flowchart illustrating reusable object cache processing.

When a partial display list to be cached is generated, or when a swapped partial display list is loaded into the cache memory, first in step S1201, the cache control unit 211 determines whether there is a sufficient free space in the cache memory. More specifically, the cache control unit 211 determines whether the free space of the cache memory corresponds to a memory capacity to be used by the partial display list or more.

If the cache control unit 211 determines that the free space of the cache memory is insufficient (NO in step S1201), the processing proceeds to step S1202. In step S1202, the cache control unit 211 selects one partial display list that is currently present in the cache memory and writes the selected partial display list to the hard disk drive.

In step S1203, the cache control unit 211 determines whether a required free space has been secured. If the cache control unit 211 determines that the required free space has not been secured (NO in step S1203), the cache control unit 211 repetitively performs the processing for writing a selected partial display list to the hard disk drive.

The cache control unit 211 performs the above-described processing and, if the memory capacity required to store the partial display list is secured (YES in step 1203), the processing proceeds to step S1204.

In step S1204, the cache control unit 211 stores the partial display list in the cache memory in cooperation with the PPML interpreter 208, the PS/PDF interpreter 209, and the JPEG/TIFF interpreter 210. As described above, a plurality of partial display lists can be generated for a piece of image data.

Accordingly, in some cases, a partial display list to be stored as cache data for a reusable object may be divided into a plurality of lists. Thus, in order to handle such a case, in step S1205, the cache control unit 211 determines whether storage of all the partial display lists into the cache memory has been completed. If the storage of all the partial display lists into the cache memory is not completed yet (NO in step S1205), the cache control unit 211 repetitively performs the above-described processing.

Next, processing for determining a priority order in the swap processing is described below. This processing is for swapping the partial display list to the hard disk drive, and the processing is occasionally performed in step S1202 illustrated in FIG. 5. A reference amount to be used in determining the priority order in the swap processing, which is a value to be allocated to each partial display list, is hereinafter referred to as "unavailable cache amount."

In the present exemplary embodiment, the cache control unit 211 calculates an unavailable cache amount with respect the partial display list stored in the cache memory based on the amount of memory used for the partial display list and the number of pages to be processed before the partial display list is used next. Then, the cache control unit 211 determines the priority order of the swap processing in descending order of the size of the calculated unavailable cache amount.

Figure 6:
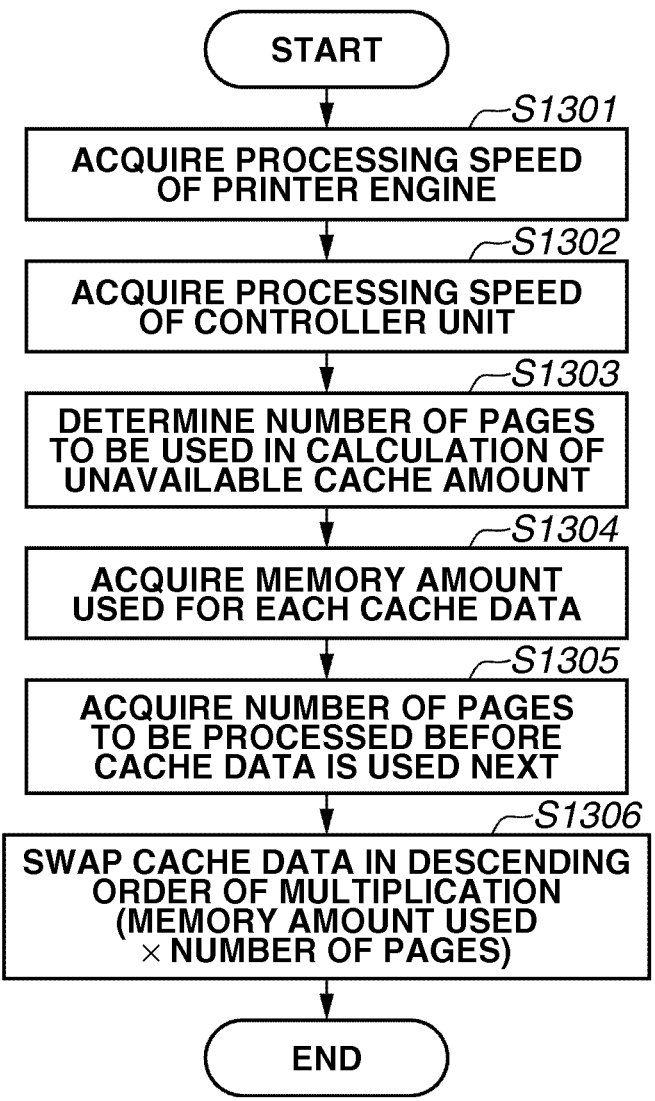
FIG. 6 is a flowchart illustrating an example of swap priority order determination processing.

An unavailable cache amount calculation method is described in detail below with reference to a flowchart illustrated in FIG. 6. FIG. 6 is a flowchart illustrating an example of swap priority order determination processing.

First, in step S1301, the cache control unit 211 acquires information about the processing speed of the printer engine 13. In step S1302, the cache control unit 211 acquires information about the processing speed of the controller unit 200. In the present exemplary embodiment, the processing speed of the printer engine 13 is expressed using the unit of "pages per minute" (PPM) that represents the number of pages printable per a minute. The processing speed of the controller unit 200 is expressed using the clock frequency of the CPU 1. The processing to be performed in step S1301 and/or in step S1302 is an example of information acquisition processing.

In step S1303, the cache control unit 211 determines the number of pages to be used in calculation of the unavailable cache amount based on the information acquired in step S1301 and step S1302. In the present exemplary embodiment, the cache control unit 211 determines the number of pages based on the processing speed of the printer engine 13 and the CPU processing speed of the controller unit 211 with reference to a table illustrated in FIG. 7. FIG. 7 illustrates an example of the table that can be used to determine the number of pages with reference to the processing speed of the printer engine 13 and the CPU processing speed of the controller unit 211.

The number of pages determined in this case can be used as an upper limit value when the cache control unit 211 searches the number of pages to be processed before each partial display list is used next (i.e., the processing to be performed in step S1305). In the present exemplary embodiment, the upper limit value to the number of pages to be searched is set for the reason described below.

In the VDP, print data may include numerous pages. For example, the number of pages included in the print data may rise up to several thousands. In such a case, employing a method for performing the search until the final print data is not desired in view of processing efficiency in calculating the number of pages to be processed before each partial display list is used next.

Hence, in the present exemplary embodiment, the cache control unit 211 calculates the number of pages (i.e., page interval) to be processed before the cache data is used next, based on information of a certain number of succeeding pages. Further, in the present exemplary embodiment, the above-described certain number of pages is set to be variable based on the processing speeds of the printer engine and the controller unit as illustrated in FIG. 7. More specifically, the cache control unit 211 sets the certain number of pages to be smaller than a predetermined number if the processing speed of the printer engine is higher than a predetermined speed and sets the certain number of pages to be greater than the predetermined number if the processing speed of the controller unit is higher than the predetermined speed, for the following reason.

When the processing speed of the printer engine is higher than the predetermined speed, it is necessary to prevent the processing of the controller unit becomes slower compared to the processing of the printer engine. To this end, the time that the controller unit can use for processing each page becomes shorter. Accordingly, in this case, it is useful to decrease the certain number of pages.

On the other hand, when the processing speed of the controller unit is higher than the predetermined speed, the controller unit can search for information of a greater number of pages during the same time. Accordingly, in this case, it is useful to increase the certain number of pages.

If the upper limit value with respect to the number of pages to be searched is determined in step S1303, then in step S1304, the cache control unit 211 acquires the memory amount used for each partial display list cached. Further, in step S1305, the cache control unit 211 acquires the number of pages to be processed before the partial display list is used next. The processing to be performed in step S1304 is an example of memory amount acquisition processing. The processing to be performed in step S1305 is an example of number-of-pages acquisition processing.

In the present exemplary embodiment, the cache control unit 211 acquires information illustrated in FIG. 8, i.e., a cache data name for identifying the cache data, the used memory amount, and the number of pages to be processed before the partial display list is used next, for each partial display list stored in the cache memory. FIG. 8 illustrates an example of information acquired by the cache control unit 211 according to the first exemplary embodiment.

If it is determined that the number of pages to be processed before the partial display list is used next exceeds the upper limit value determined with respect to the number of pages in step S1303, the cache control unit 211 regards the number of pages to be processed before the partial display list is used next as being equal to the upper limit value determined in step S1303.

In step S1306, the cache control unit 211 calculates the unavailable cache amount and swaps the cache data. In the present exemplary embodiment, the cache control unit 211 obtains a multiplied value (used memory amount)×(number of pages to be processed before cache data is used next) and regards the obtained value as the unavailable cache amount. Accordingly, the cache control unit 211 can obtain unavailable cache amounts illustrated in FIG. 9 with reference to situations illustrated in FIG. 8. FIG. 9 illustrates an example (part I) of the unavailable cache amounts calculated according to the first exemplary embodiment.

The cache control unit 211 writes the unavailable cache amounts to the hard disk drive in descending order of the size thereof. More specifically, the swap priority order decreases in order of object02, object01-01, object01-02, object03-01, object03-02, and object01-03.

The unavailable cache amount calculation method according to the exemplary embodiment is not limited to the above-described method. For example, the cache control unit 211 can perform the above-described processing according to a method that directly uses the number of pages to be processed before the cache data is used next as unavailable cache amount, or according to a method that uses a multiplied value (used memory amount)×(number of pages to be processed before the cache data is used next−1) as unavailable cache amount. Examples of the unavailable cache amounts calculated according to the above-described methods are indicated in columns A and B of a table illustrated in FIG. 10. FIG. 10 illustrates an example (part II) of the unavailable cache amounts calculated according to the first exemplary embodiment.

As described in the present exemplary embodiment, when the search of information required to determine the swap priority order is limited to a variable number of succeeding pages, it is feasible to improve efficiency in the cache control. Further, in the print data processing apparatus, it is feasible to prevent the processing time of the controller unit from increasing.

The method for determining the number of pages as illustrated in FIG. 7 has been described as a simple example according to the present exemplary embodiment. Accordingly, in realizing the processing according to the present exemplary embodiment, it is necessary to acquire information about the processing speeds of the printer engine and the controller unit only once when a job starts. Alternatively, the necessary information can be directly written into the main body of the control program.

However, it is necessary to acquire the information dynamically during the execution of the print data processing if actually measured processing speed values are used during the print data processing, as an effective example, instead of acquiring the hardware specification values of the printer engine and the controller unit.

Further, as another example, the number of pages of partial display lists that are not reused during the processing of the certain number of succeeding pages can be replaced by the number of pages of partial display lists that are not reused until the processing of the print data is completed.

Further, in the above-described exemplary embodiment, the print data processing apparatus has performed the swapping in descending order of multiplied value (used memory amount)×(the number of pages). However, it is also useful to perform the swapping in descending order of the used memory amount or in descending order of the number of pages. Namely, the cache control unit 211 can prioritize the swapping of cache data which includes a large number of pages. Alternatively, the cache control unit 211 can prioritize the swapping of cache data which uses a large memory amount.

An unavailable cache amount calculation method according to a second exemplary embodiment, which is different from the first exemplary embodiment, is described below.

In the second exemplary embodiment, the cache control unit 211 acquires information of respective items illustrated in FIG. 11. FIG. 11 illustrates an example of the information that can be acquired by the cache control unit 211 according to the second exemplary embodiment.

More specifically, the cache control unit 211 acquires information of several items, i.e., a name for identifying the partial display list, the used memory amount, and the number of pages not using the partial display list while the certain number of succeeding pages are processed for each partial display list stored in the cache memory. The cache control unit 211 calculates unavailable cache amounts illustrated in FIG. 12 based on the above-described acquired information.

FIG. 12 illustrates examples of the unavailable cache amounts calculated according to the second exemplary embodiment. Numerical values in the column A of the table illustrated in FIG. 12 are examples of unavailable cache amounts that are respectively equal to the number of pages not using the partial display list while the certain number of succeeding pages is processed. Numerical values in the column B of the table illustrated in FIG. 12 are examples of unavailable cache amounts that are respectively equal to multiplied value (used memory amount)×(the number of pages not using the partial display list while the certain number of succeeding pages are processed) calculated for each partial display list. In any case, the swap priority order set for each partial display list becomes lower in descending order of the unavailable cache amount.

Next, a third exemplary embodiment is described below. In the variable data printing, there is a need for outputting print data that is subjected to imposition processing. When the print data processing apparatus performs the imposition processing, the order of pages included in the print data input to the print data processing apparatus is different from the order of actually processed pages.

For example, it is assumed that print data including eight pages is printed by two-sided and saddle stitch binding. In this case, the order of pages to be processed by the print data processing apparatus are 4, 5, 6, 3, 2, 7, 8, and 1 in page number if the print processing starts with the left page on the innermost sheet in the saddle stitch binding. In such a case, it is desired to calculate the number of pages to be processed before a partial display list is used next, or the number of occurrences of the list while the certain number of succeeding pages are processed, with reference to the order of pages actually processed by the print data processing apparatus, rather than referring to the page numbers in the print data. Example calculation processing according to the present exemplary embodiment is described in detail below.

As illustrated in FIG. 13, it is assumed that three partial display lists are cached in the cache memory, and the page numbers of the pages on which each partial display list appears is described in the second column of the table illustrated in FIG. 13. Example processing for determining a partial display list to be swapped based on the number of pages to be processed before the partial display list is used next, as in the case of the first exemplary embodiment, is described below.

FIG. 13 illustrates an example of number-of-pages calculation method that is applicable to a saddle stitch binding print operation. It is assumed that the number of pages included in a print job is eight pages, and the page number of a presently processed page is 6. The number of pages to be processed before each partial display list is used next is described in the third column of the table illustrated in FIG. 13. In this case, the values in the third column are inappropriate in view of cache data control. For example, according to the actual processing order, cache data "object 1" should be reused for the next page but one. On the other hand, the cache data "object 1" is not reused if the print processing is performed based on the page numbers in the print data.

In such a case, as illustrated in the fourth column of FIG. 13, it is desired that the print processing is performed by controlling the cache data based on the order of pages to be actually processed. In the present exemplary embodiment, the cache control unit 211 determines the swap priority order by taking the order of pages to be actually processed into consideration when the print data processing apparatus performs the imposition processing.

As described above, each of the above-described embodiments can provide a system capable of determining the writing priority order of cache data in the variable print processing so as to reduce the number of swap operations for the cache data generated during the print data processing.

Aspects of the present invention can also be realized by a computer of a system or apparatus (or devices such as a CPU or a micro-processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In an example, a computer-readable medium may store a program that causes a print data processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-007154 filed Jan. 17, 2011, which is hereby incorporated by reference herein in its entirety.

What is claimed is:

1. A print data processing apparatus configured to process variable print data, the print data processing apparatus comprising:
    a cache unit configured to cache image data generated according to a drawing command included in the variable print data as cache data in a cache memory;
    a determination unit configured to determine whether newly generated image data can be stored in the cache memory;
    a count unit configured to count, in a case where the determination unit determines that the new generated image data cannot be stored in the cache memory, a number of first pages to be processed before first cache data cached in the cache memory is used next and count a number of second pages to be processed before second cache data cached in the cache memory is used next;
    a determining unit configured to determine the first cache data as cache data to be written in a secondary storage medium, in a case where the number of first pages is greater than the number of second pages; and
    a writing unit configured to write the first cache data determined by the determining unit in the secondary storage medium.

2. A method for executing cache processing in a print data processing apparatus configured to process variable print data, the method comprising:
    caching image data generated according to a drawing command included in the variable print data as cache data in a cache memory;
    determining whether newly generated image data can be stored in the cache memory;
    determining count, in a case where it is determined that the new generated image data cannot be stored in the cache memory, a number of first pages to be processed before first cache data cached in the cache memory is used next and count a number of second pages to be processed before second cache data cached in the cache memory is used next;

determining the first cache data as cache data to be written in a secondary storage medium, in a case where the number of first pages is greater than the number of second pages; and writing the first cache data determined in the secondary storage medium.

3. A non-transitory computer readable storage medium storing a program that causes a print data processing apparatus to perform the method of claim 2.

* * * * *